July 23, 1940. R. E. STURM ET AL 2,209,212
PRESSURE GAUGE
Filed April 7, 1938 2 Sheets-Sheet 1

INVENTORS.
RALPH E. STURM
BY GEORGE V. ELTGROTH
McConkey Davison & Booth
ATTORNEYS.

July 23, 1940.  R. E. STURM ET AL  2,209,212
PRESSURE GAUGE
Filed April 7, 1938  2 Sheets-Sheet 2
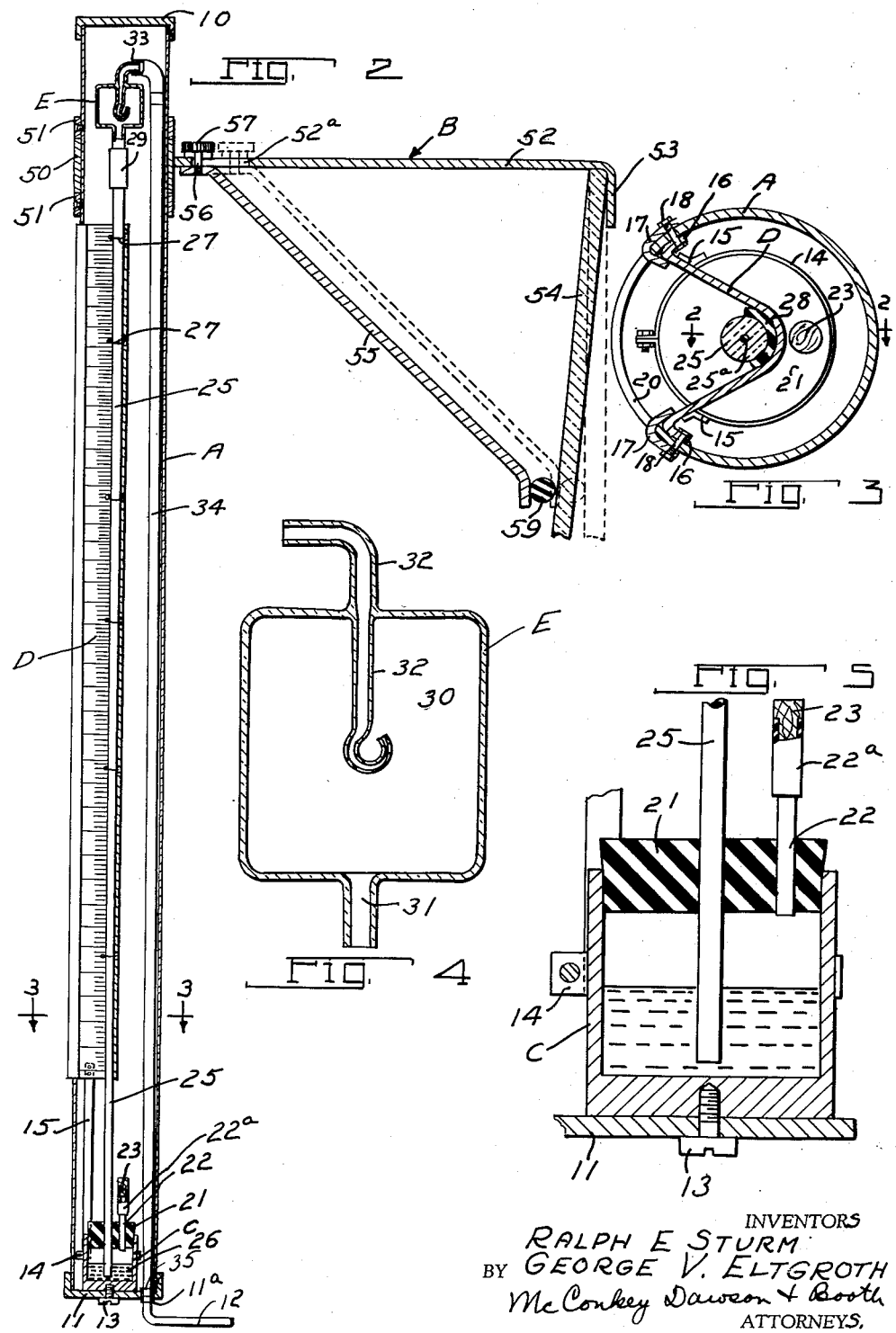
INVENTORS
RALPH E STURM
BY GEORGE V. ELTGROTH
McConkey Dawson & Booth
ATTORNEYS.

· Patented July 23, 1940

2,209,212

UNITED STATES PATENT OFFICE 2,209,212

PRESSURE GAUGE

Ralph E. Sturm and George V. Eltgroth, Baltimore, Md., assignors to Bendix Radio Corporation, Baltimore, Md., a corporation of Delaware Application April 7, 1938, Serial No. 200,691

3 Claims. (Cl. 73—31)

This invention relates to a pressure gauge and more particularly to a gauge of the type in which the height of a column of liquid in a tube is an indication of the pressure being measured. The apparatus of this invention is especially useful for measuring the pressure at the intake of an automobile engine, but may have other uses.

An objection of this invention is to provide a pressure gauge which will measure the pressure at the intake of an internal combustion engine and which may be conveniently operated for making such measurement.

A further object is to provide adequate means supporting the tube of such an instrument so that it will be vertical and will give an accurate reading easily visible to observers taking the measurement. Since, in such an instrument, the vertical height of the column of liquid supported is the measure of the pressure desired to be tested, it is necessary that the tube be maintained at a strictly vertical position when the reading is taken, and considerable difficulty has heretofore been experienced in holding such an instrument in vertical position to obtain a correct reading. To overcome this difficulty, we provide a bracket structure which will fit over the car door window whereby the gauge may be supported in its correct vertical position even should the window pane be inclined inwardly.

In the use of such an instrument by filling station operators and others not accustomed to the use of delicate measuring instruments, the instrument is likely to be laid down on its side or upturned. In ordinary gauges of this character wherein mercury or other liquid is used, such use would result in the liquid being spilled out of the top of the tube and wasted. To overcome the danger of spilling, we provide a catch basin at the top of the tube which is effective to prevent passage of mercury therethrough but which at the same time will allow passage of air and permit the proper functioning of the instrument.

It is a further object of the invention to provide a strong and sturdy construction which will so far as possible avoid breakage or damage and will permit its use in unfavorable weather and conditions of climate.

Another object is to provide an arrangement of parts which enables easy construction and gives rise to a novel method of assembly. Other objects and advantages will become apparent as the specification proceeds.

A preferred embodiment of the invention is illustrated in the accompanying drawings in which—

Figure 2 is a vertical sectional view taken as indicated at line 2—2 of Figure 3;

Figure 3 is an enlarged sectional view taken as indicated at line 3—3 of Figure 2;

Figure 4 is an enlarged sectional view of the catch basin; and

Figure 5 is an enlarged sectional view of the liquid cistern.

Figure 1:
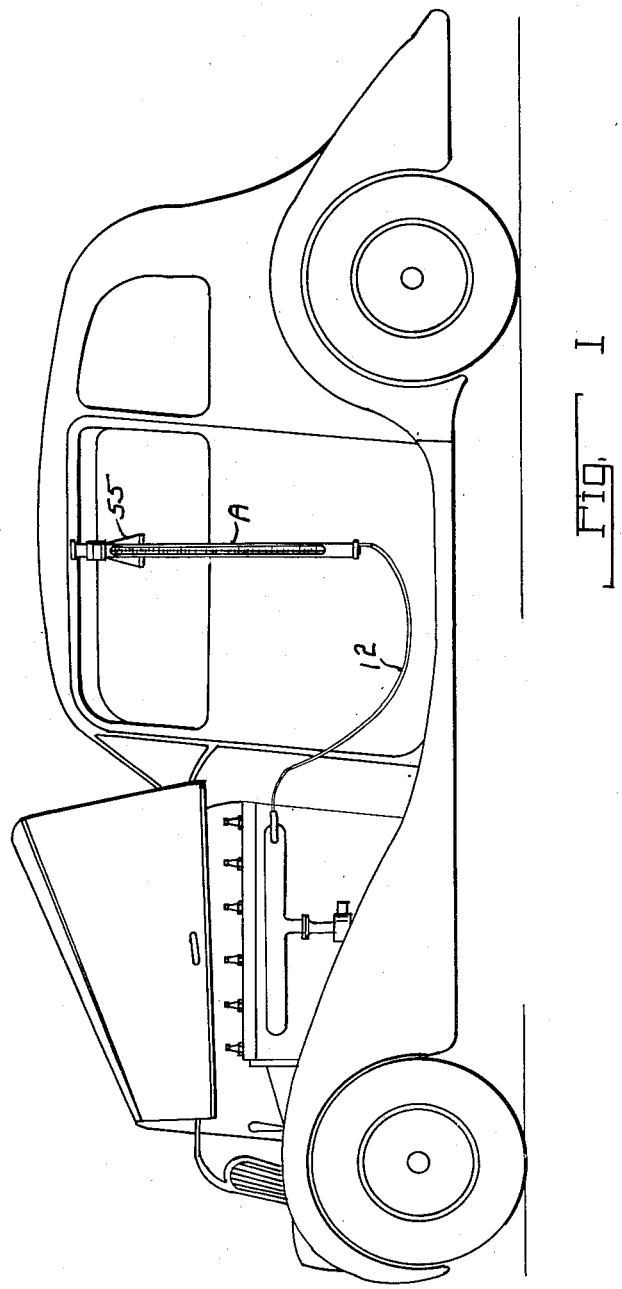
Figure 1 is an illustrative view showing the improved instrument as used on an automobile to measure the strength of intake vacuum.

As illustrated the improved instrument comprises an exterior unit including the casing A and supporting means B, and comprises also an interior unit including a cistern C, a gauge member D, and the catch basin E.

The casing A is preferably tubular and cylindrical in form and has a longitudinal opening 20 cut in its side through which the tube and gauge member are visible. This casing may be made of any suitable kind of material, preferably of a light weight metal. At its top end casing A may be provided with a cap 10, and at its bottom may have the cap 11 which is provided with a fitting 11a for connecting a hose 12 thereto and which is also provided with the screw 13 adapted to secure this cap to the cistern.

The air within casing A is at atmospheric pressure, the joints of the casing being sufficiently open to permit entrance of the small amount of air necessary for this purpose. If desired, however, other suitable openings may be made in the casing to permit the entrance and egress of air.

The cistern C, as here shown, is in the form of a cylindrical cup and may be of any suitable material. It is secured to the bottom of the casing by the screw 13 extending through the bottom cap and is secured otherwise by a supporting structure including a band clamp 14 extending about it. Attached to clamp 14 are the vertical angle members 15 extending upwardly and secured at their upper ends to the gauge member D.

Member D is a piece having V-shaped cross section as seen more clearly in Figure 3, and having its edges 16 turned backwardly and disposed adjacent the edges of opening 20 in the casing. It extends the whole length of opening 20 and is secured to the casing by means of the corner angle strips 17. These strips are secured by the bolts 18 which extend through the walls of casing A and through the edge portions 16 of the gauge member D.

The cistern C is provided with a closure 21 having a pair of openings therethrough and made preferably of some resilient material such as soft rubber. Through one of these openings extends the tube 22 having a hose 22a attached to its upper end. Into the hose 22a is fitted a stopper 23 which may be formed of porous wood pervious to the air but impervious to mercury or other liquid which is to be used in the instrument. Through the other of the openings of closure 21 extends the tube 25. The tube 25 is preferably of glass and has a small bore 25a of substantially uniform diameter. Its lower end extends below the cistern closure and into the pool 26 of mercury or other liquid contained in the cistern. Extending upwardly from the cistern the tube 25 is disposed within the crotch of the gauge member D and is made fast to this member by a wire thread 27 which binds the tube against the resilient cushion 28 disposed between the tube and the gauge member. It is understood that the tube may be secured in any suitable manner and cushion 28 may be omitted when desired.

The top of tube 25 is connected as by the rubber tube 29 with the catch basin E which provides an air chamber 30 sealed except for the opening 31 communicating with the interior of the tube and the air passageway provided by the neck or conduit 32. On the interior of the basin walls the conduit 32 extends downwardly and has its extreme end turned backwardly, the end opening facing upwardly and approximately in the center of the chamber. The outer portion of conduit 32 is connected by means of rubber tubing 33 to the pipe conduit 34 which extends downwardly along the rear of the casing and has its lower end connected by tubing 35 with the fitting 11a secured in the bottom cap 11.

About the top portion of casing A is a ring 50, and this ring is held in fixed vertical position on the casing by the upper and lower holding rings 51 which are fixedly secured on the casing by set screws or other suitable means. Extending laterally from ring 50 is an arm or strap 52 which at its base end is secured as by welding to ring 50 and which at its extreme lateral end is provided with a hook or finger 53 which may be conveniently hooked over the top edge of a car door window pane 54 shown more clearly in Figure 2.

The brace strap 55 extends diagonally laterally and downwardly from the base portion of arm 52. At its upper end this brace is equipped with a bolt 56 which extends upwardly through a slot 52a disposed longitudinally at the base of arm 52. Tightening of the thumb nut 57 on the upper end of bolt 56 secures the brace in position with respect to the arm. The extreme lateral end of brace 55 is preferably provided with a cushion 59 adapted for direct contact with the window pane of the motor car.

To operate the instrument for testing the pressure of the intake at the cylinders of an engine, the operator hooks arm 52 over the top edge of the window pane as illustrated in Figures 1 and 2, and then by loosening the knurled nut 57, moves the brace member inwardly or outwardly, depending upon inclination of the window pane which is being used, so as to cause the casing A to be supported in vertical position. It will be observed that this type of support maintains the casing vertical in both planes, and the brace 53 may be made as wide as necessary to effect vertical stability of the casing in a plane longitudinal of the motor car.

The hose 12 may then be connected to the intake of the engine and the reading observed on the gauge piece D. Preferably this gauge piece is graduated in the form of a scale just adjacent the tube 25, the scale being compensated for the difference in level of the liquid in pool 26 as the liquid rises within the tube. The height of the mercury may be conveniently read on this scale. It is obvious that when a lower pressure is developed at the intake of the engine, the liquid will be caused to rise to a higher level in tube 25, and the measurement of the intake air pressure is thus measured. By this measurement it can be ascertained whether or not the motor is functioning properly and at least some indication can be had as to the cause of motor trouble.

With the tubular casing a turned so that the opening 20 faces outwardly from the car, the garageman or attendant may clearly observe the reading of the gauge. Then, if desired, the casing A may be turned within ring 50 so that the opening 20 faces inwardly toward the driver's compartment, and in this position the driver of the motor car while still sitting behind the steering wheel may clearly observe the reading of the instrument and may see for himself through the window pane this indication of the performance of his engine.

When the instrument is not in use, the garageman or attendant may lay it down on its side or may invert it without danger of wasting the liquid contained in it. If, for example, the instrument is at any time inverted, any liquid that may be contained within tube 25 will flow into the catch basin E and will be there retained until the instrument is again upturned to its proper operative position when it will drain down the tube 25 into the cistern C again. The chamber 30 should be of such capacity that it will hold substantially all the liquid that could be contained in tube 25 without being filled to the level of the opening in conduit 32 at any position of the instrument. Having the inner end portion of conduit 32 turned backwardly aids in shielding the opening to this conduit from liquid that may be emitted rapidly into the chamber from the top of tube 25.

While we have shown and described but a single embodiment of the invention it is apparent that other embodiments may be made and various changes may be made in the construction as above described without departing from the spirit of the invention. The foregoing detailed description has been given for clearness of understanding only and no unnecessary limitations should be understood therefrom, but the appended claims should be construed as broadly as permissible in view of the prior art.

We claim:

1. An instrument of the type in which a liquid column is supported within a tube for measuring the pressure at the intake of an internal combustion engine in motor cars comprising: a hollow tubular casing enclosing said tube, said casing having an opening through its walls through which said tube is visible, a collar extending about said tubular casing and rotatable with respect to said casing, means for holding said collar in fixed vertical position on said casing, an arm secured to said collar and extending laterally from said casing, said arm having its end portion adapted to be hooked over the top edge of a window pane of said motor car, and a brace attachable to said arm at different lateral positions, said brace extending laterally downward from said attachment and being adapted to engage the side of said window pane to maintain said casing in true vertical position.

2. An instrument of the type in which a liquid column is supported within a tube for measuring the strength of vacuum at the intake of an internal combustion engine in motor cars comprising a hollow tubular casing enclosing said tube, said casing having an opening through which said tube is visible from the exterior of said casing, bracket means for engaging a body member of said motor car to support said casing in vertical position adjacent said motor car, said bracket means including a collar in which said casing is movably received, and a stop member carried by said casing and engaging said collar to limit longitudinal displacement of said casing.

3. An instrument of the type in which a liquid column is supported within a tube for measuring the strength of vacuum at the intake of an internal combustion engine in motor cars comprising a hollow tubular casing enclosing said tube, said casing having an opening through which said tube is visible from the exterior of said casing, bracket means for engaging a body member of said motor car to support said casing in vertical position adjacent said motor car, said bracket means including a collar in which said casing is movably received, and spaced stop members fixed to said casing and providing abutment surfaces cooperating with the top and bottom surfaces of said collar to limit the longitudinal displacement of said casing.

RALPH E. STURM.
GEORGE V. ELTGROTH.